J. D. WILBER.
Harvesters.

No. 138,830.

4 Sheets--Sheet 2.

Patented May 13, 1873.

Witnesses.
R. T. Campbell
J. N. Campbell

Inventor
John D. Wilber
by,
Mason, Fenwick & Lawrence

J. D. WILBER.
Harvesters.
No. 138,830.
Patented May 13, 1873.
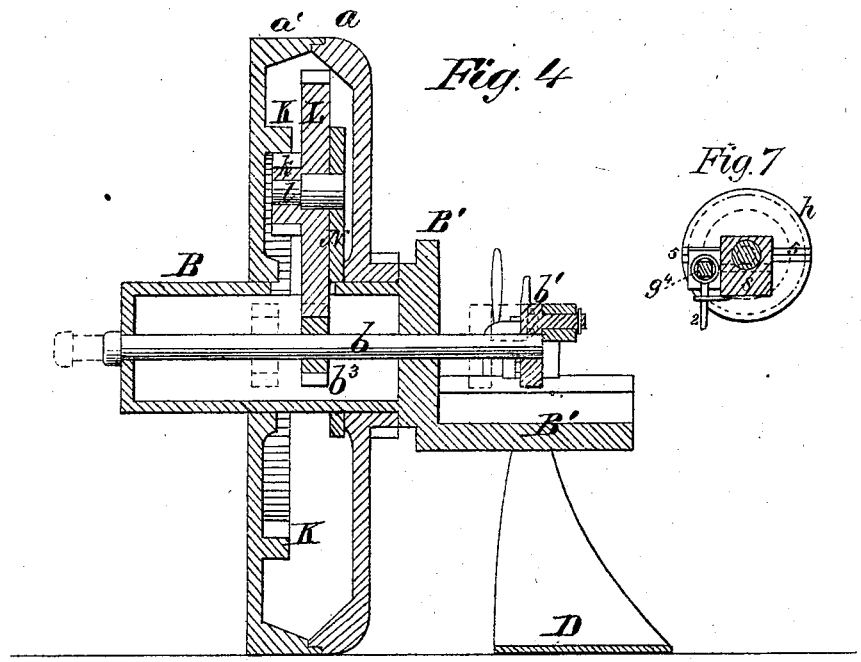
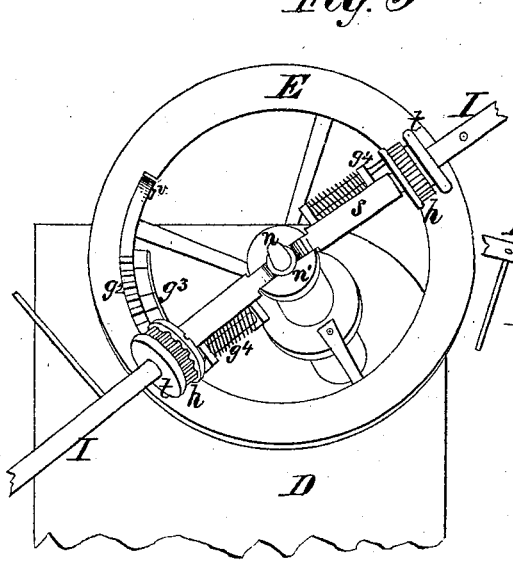
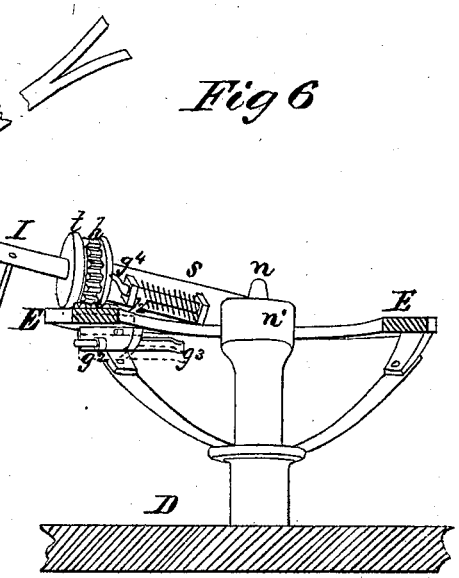
Witnesses.
Inventor

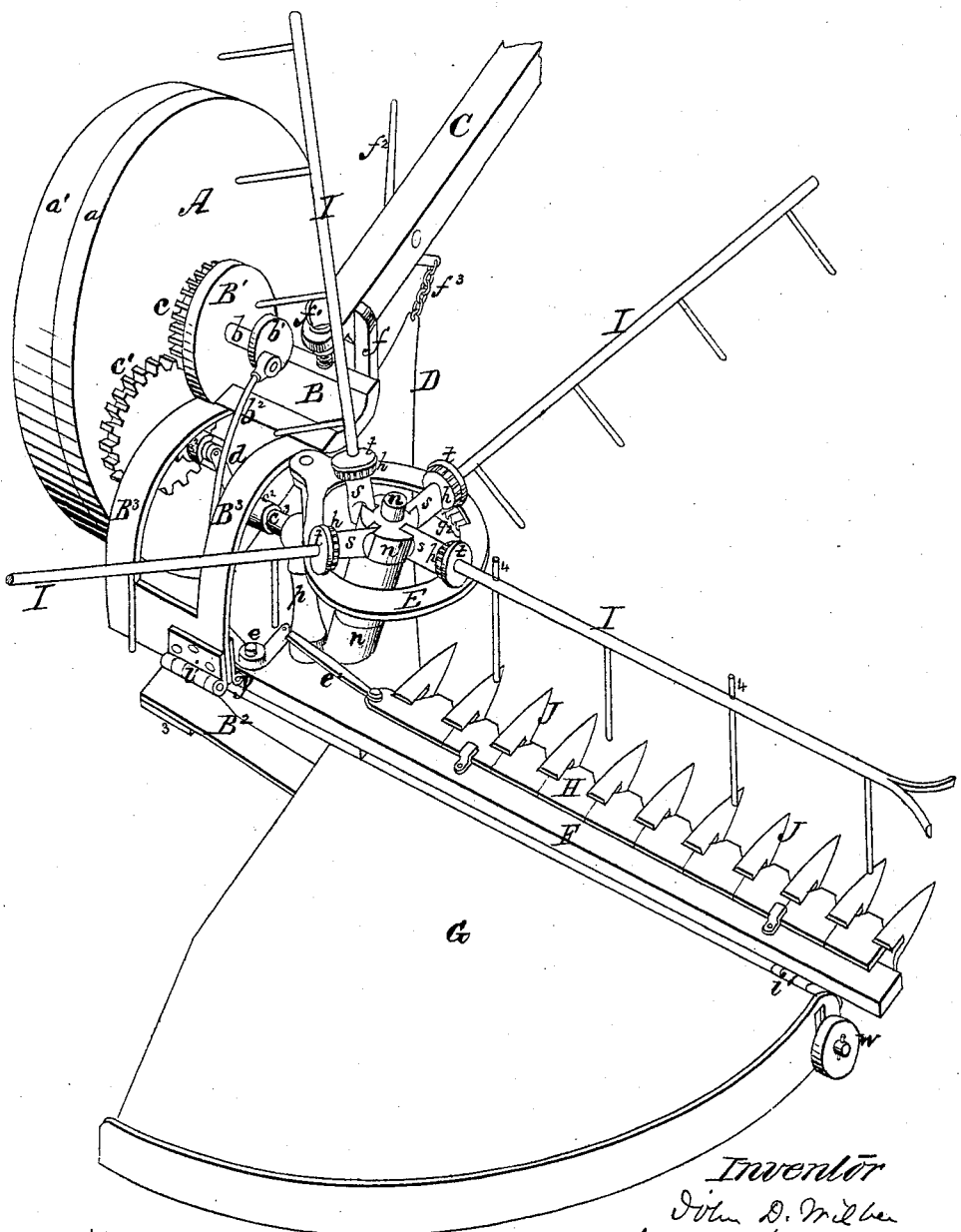

UNITED STATES PATENT OFFICE.

JOHN D. WILBER, OF POUGHKEEPSIE, NEW YORK.

IMPROVEMENT IN HARVESTERS.

Specification forming part of Letters Patent No. 138,830, dated May 13, 1873; application filed May 3, 1872.

*To all whom it may concern:*

Be it known that I, JOHN D. WILBER, of Poughkeepsie, and county of Dutchess, in the State of New York, have invented certain new and useful Improvements in Reaping-Machines; and I do hereby declare that the following is a full, clear, and exact description thereof, reference being had to the accompanying drawing making a part of this specification, in which—

Figure 1:
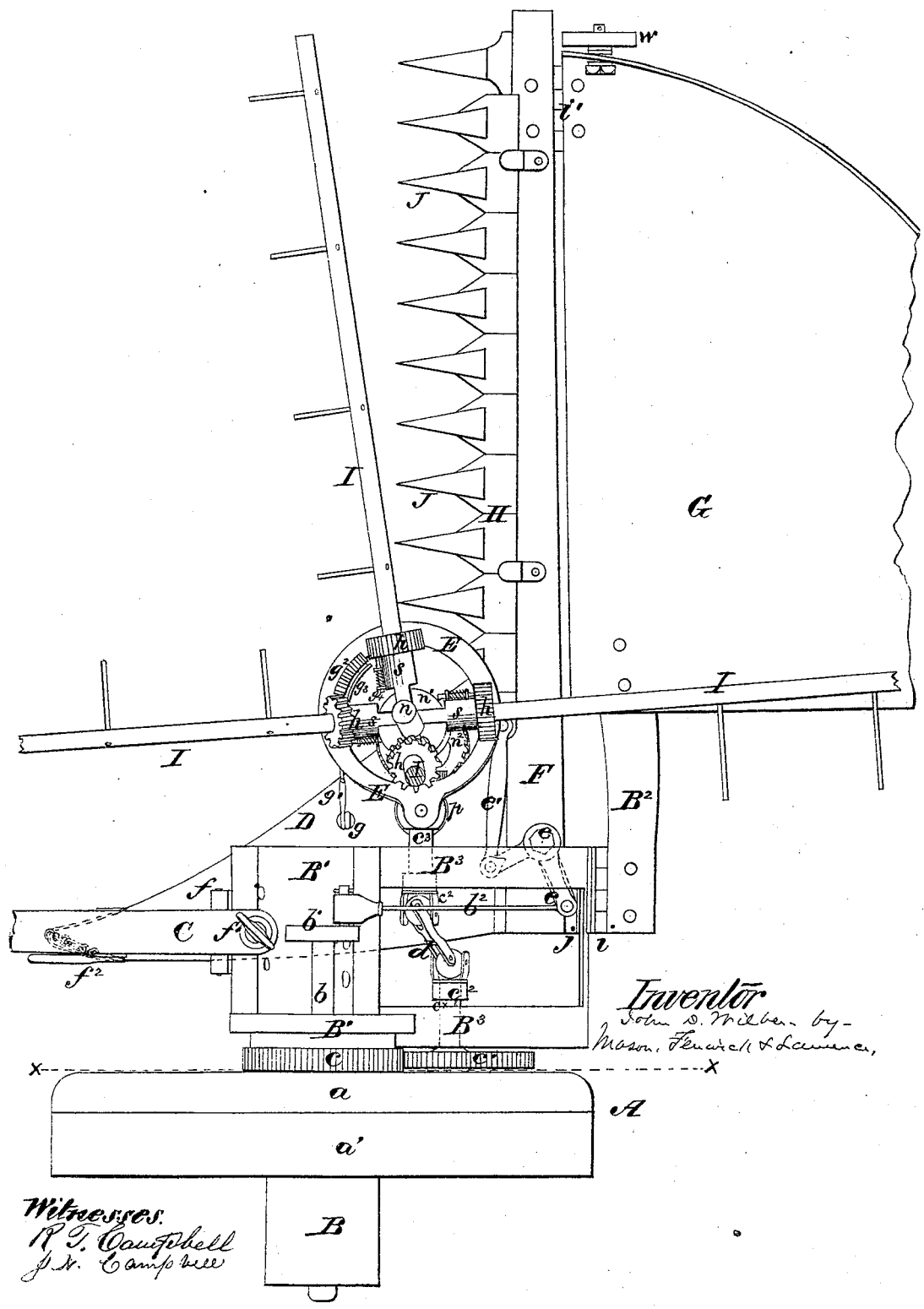
Figure 2:
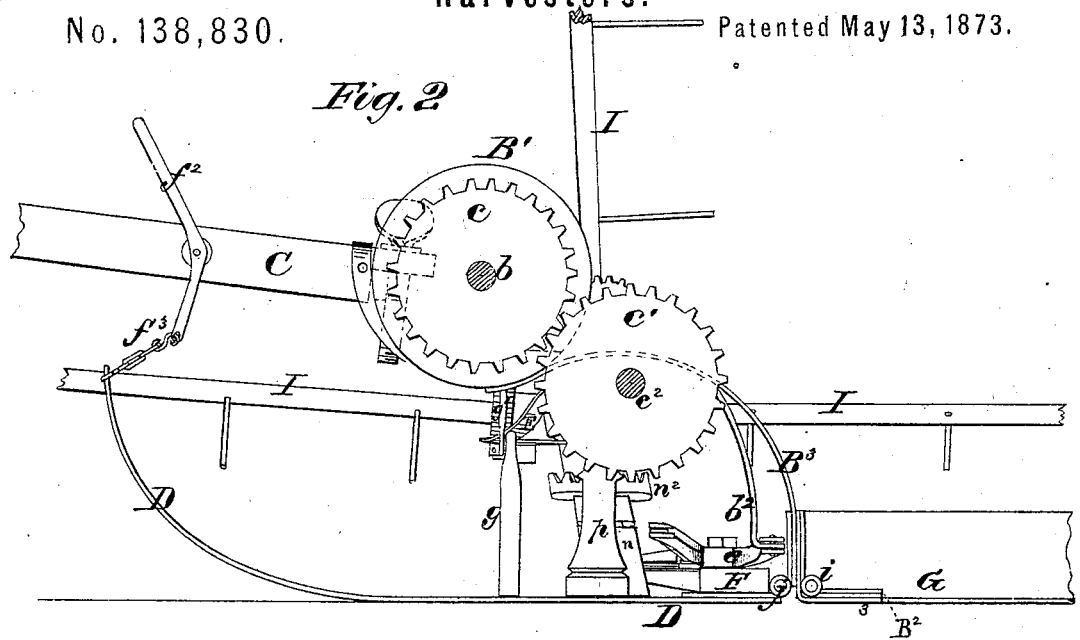
Figure 3:
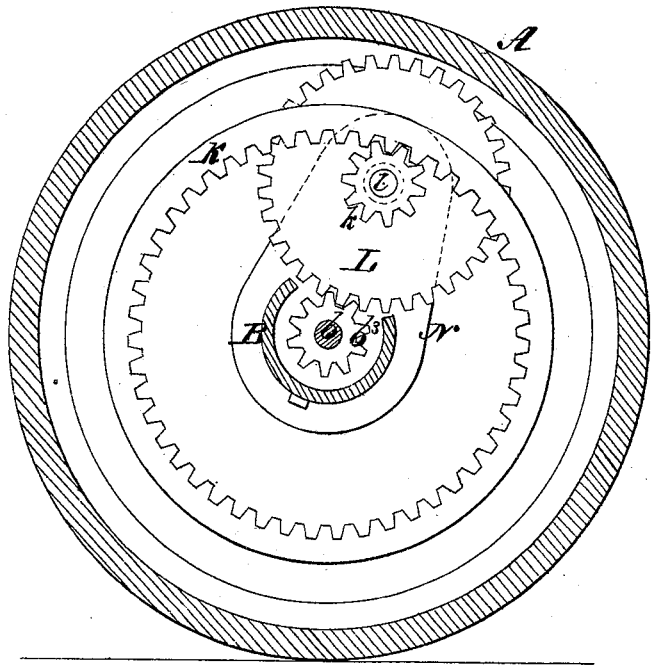

Figure 1, Plate 1, is a top view of my improved reaper with the rear portion of the platform broken away. Fig. 2, Plate 2, is a section taken vertically and longitudinally through the reaper in the plane indicated by dotted line $x\ x$, Fig. 1. Fig. 3, Plate 2, is a section taken vertically through the driving-wheel, showing all the gearing therein. Fig. 4, Plate 3, is a vertical transverse section through the driving-wheel, the axle thereof, the frame, and the inner shoe, showing the shaft and crank-wheel which communicate reciprocating motion to the sickle. Fig. 5, Plate 3, is a top view of the devices which operate the raking-arms. Fig. 6 is a diametrical section through Fig. 5. Fig. 7, Plate 3, is a view showing one of the rollers of a rake and beater arm and the notches therein. Fig. 8, Plate 4, is a perspective view of the machine complete.

Similar letters of reference indicate corresponding parts in the several figures.

This invention relates to certain novel improvements on reaping-machines, wherein a single driving-wheel is employed, and the cutting apparatus is located in rear of the axle of said wheel; and wherein revolving, raking, and beating arms are mounted upon the inner shoe in such manner that these arms deliver the grain from one side of the platform upon the ground in rear of the track of the team, and out of the way of the team, in their succeeding round, as will be hereinafter explained.

The following description of my invention will enable others skilled in the art to understand it.

In the accompanying drawing, A represents the driving and transporting wheel, which is made hollow and of two parts, $a\ a'$, properly secured together, and which incloses several spur-wheels. This wheel A turns loosely about a hollow axle, B, which is rigidly connected to or cast with the main carrying frame B', as shown in Fig. 4. Inside of wheel A, and rigidly connected to the left-hand or outer section $a'$, is an inside gear-wheel, K, the teeth of which engage with a pinion, $k$, which, with a large spur-wheel, turns around a stud, $l$, on an arm, N, which is rigidly secured to the hollow hub B. The two wheels $k$ and L are connected together either rigidly or by ratchet and pawl, and the largest wheel L engages with a pinion, $b^3$, on a crank-wheel shaft, $b$. By this means, when the wheel A revolves around its axle B, the shaft $b$ receives a rapid rotary motion. On the right-hand end of shaft $b$ is keyed a crank-wheel, $b^1$, to the wrist-pin of which the forward end of a curved connecting-rod, $b^2$, is applied, the rear end of which rod is pivoted to one arm of a right-angular lever, $e$, which oscillates about a stud on the finger-bar E, and which is connected by a rod, $e'$, to the sickle-bar H. The shaft $b$ with its pinion $b^3$ is allowed to receive endwise play, so that by means of a lever applied to its left-hand end, or other equivalent means, the attendant riding on the machine can stop or start the motion of the sickle at pleasure. I will here remark that the standard of the seat for the attendant may rise from that portion of the axle B which is exposed beyond the left-hand side of wheel A. On the right-hand side of wheel A, outside thereof, a spur-wheel, $c$, is secured concentrically to it, which engages with a spur-wheel, $c^1$, on a shaft, $c^\times$, which has its bearings in one of the arched extensions $B^3$ of the frame $B^1$. The shaft $c^\times$ is connected to a shaft, $c^3$, which has its bearing in a post, $p$, rising from a shoe, D, by means of a universal coupling, $d$, and sliding collars $c^2$, and on the right-hand end of the shaft $c^3$ a spur-wheel is keyed, (not shown in drawing,) which engages with a crown spur-wheel, $n^2$, and communicates rotary motion to a hub, $n^1$, carrying the rake and beater arms I, as will be hereinafter explained.

The universal coupling-joint $d$, which is between the sliding-collars $c^2$, on shaft $c^\times$, and $c^3$, allows the latter shaft to be arranged considerably below the shaft $c^\times$, and at the same time to receive a steady motion therefrom. This joint, $d$, also, allows the guardfingers, with the shoe D, to have free articulation vertically, (as will be hereinafter explained,) without any binding action whatever. The tongue C is connected to standards $f$, rising from the front edge of frame $B^1$ by means of a transverse pivot, and in rear of this pivot by means of a screw, $f^1$, which passes freely through the rear extension of the tongue, with collars above and below it, and is tapped into the frame $B^1$. By means of this screw $f^1$ the angle or pitch of the tongue, with respect to the frame $B^1$, can be raised or depressed. Forward of this adjustable connection $f^1$, of the tongue C, and pivoted to the latter, is an angular hand-lever, $f^2$, the lower end of which is connected by a chain, $f^3$, to the front upturned end of the shoe D. The object of this lever is to enable the attendant to raise or depress the front end of the shoe D, and with it the cutting apparatus. The upper arm of lever $f^2$ will, in practice, be provided with a ratchet, segment, or some other equivalent device with which it may be engaged after its adjustment for retaining the shoe and its attachments in the position desired. The shoe D is a broad plate to which is rigidly secured the left-hand end of the finger-bar E. This shoe extends forward and upward, and is tapering, as shown in Figs. 1, 4, and 8. Its broad, flat portion supports the post $n$, around which the rake-hub $n^1$ turns, also, the post $p$, which affords a bearing for the shaft $c^3$, and also a post, $g$, to which an angular lever $g'$ is pivoted. The rear edge of the shoe D is connected to the rear arched extension $B^3$ of frame $B^1$ by means of a hinge, $j$, shown in Figs. 1, 2, and 8, which hinge allows the vertical adjustment of the front end of shoe D, above described; and as the finger-bar is secured upon the shoe, this bar also receives the same movement which is given to the shoe. The points of the fingers J are thus allowed to be adjusted higher or lower, as circumstances require. Just in rear of the hinge $j$, which connects the left-hand end of the finger-bar to the arched extension $B^3$, of the frame $B^1$, is a hinge, $i$, with a stop, 3, below which hinge, by means of an extension, $B^2$, connects the left-hand end of the platform G to the said arched extension $B^3$. The right-hand extremity of the platform is connected to the finger-bar F, by means of a hinge, $i'$, which, with the hinge $i$, allows the platform to vibrate freely above stop 3, independently of the finger-bar F, and independently of the extension $B^3$ of frame $B^1$. The right-hand and front extremity of the platform G is supported on the ground by means of a wheel, $w$, the axle of which is connected to the platform by a nut, and is adjustable. The hinged platform is a segment of a circle, which is concentric to the axis of revolution of the arms I, the left-hand edge of which platform terminates some distance outside of the wheel A, so that the gavels are are left on the ground in rear of the shoe D, and out of the way of the team in every succeeding round. The post $n$, around which the rakes or beaters, as the case may be, revolve, is, as above stated, supported upon the shoe D, a little to the right of the post $p$, and in advance of finger-bar F. This post $n$ is inclined forward and to the right-hand, and around it turns the hub $n^1$, to which the arms I are pivoted. There are four arms, I, connected to the hub $n^1$, which are guided in their revolution by means of a cam-way, E, which is rigidly secured to an upper extension of the post $p$, or which may be rigidly secured to the inclined post $n$, by means of curved arms. This cam-way E is concentric to the axis of the post $n$, and its left-hand half is raised, as shown in Fig. 8, so that the arms I will be raised after leaving the platform G, and rapidly descend again as they sweep around toward the swath. Each arm I is connected to a short socketed shaft, $s$, so that it, the arm, will oscillate about its long axis, and each shaft $s$ is connected to the hub $n^1$ by means of a pivot, which will allow the arm connected to it to rise and descend, and follow the curvature of the cam-way E. Each arm I is provided with rake-teeth for raking the grain off the platform G, and each arm, by its connections to the slatted hub $n^1$, is allowed to receive two motions—to wit, a vertical motion, which it receives from the cam-way E, and an oscillating motion about its longitudinal axis, which latter motion it receives from a toothed segment, $g^2$, acting on a toothed wheel, $h$. The toothed segment $g^2$ has a sufficient number of teeth on its upper edge to give the toothed wheel $h$, which is keyed on each arm I, one-half of a revolution. The segment $g^2$ is pivoted at $v$ to the cam-way E, and is recessed into this cam-way, as shown in Figs. 1 and 5, in a position to be in the track of the pinions $h$ on the arms I as they sweep around. This toothed segment $g^2$ is provided with a cam-rail, $g^3$, on its inner side, and on its outer side it is pivoted to one arm of the right-angular hand-lever $g^1$, which has its bearings in the upper end of the post $g$ rising from the shoe D. By means of the lever $g^1$ the toothed segment can be raised or depressed, so as to engage or not with any one or more of the wheels $h$ on the arms I. The arms I are supported on their cam-way E by means of an anti-friction roller, $t$, larger than the wheels $h$, and on the inner sides of the toothed wheels $h$ notches 5 are made diametrically across them—that is to say, there is a notch made into the face of each wheel $h$ on each side of its arm I, as shown in Fig. 7, Plate 3. On one side of each shaft $s$ a spring-latch, $g^4$, is applied having a short arm, 2, extending out from its lower edge, which arm will strike the rail $g^3$ when segment $g^2$ is raised just before the toothed wheel of each arm engages with this segment, and release the wheel $h$, allowing it, with its arm I, to make one-half a revolution, when the bolt $g^4$ will again lock the wheel and arm. By these means the rake-arms can be made to serve as beater or reel arms at the pleasure of the attendant.

When the segment $g^2$ is depressed the arms I will sweep around without being rotated about their own axis; and when it is desired to convert a rake-arm into a reel-arm, or vice versa, it is only necessary for the attendant to grasp lever $g^1$ and raise the segment $g^2$, and allow it to release an arm and give it one-half a revolution about its axis.

By reference to Fig. 8 it will be seen that I have represented the extremity of one arm, I, forked, the forked ends being curved in opposite directions and spread out in a plane at right angles to the rake-teeth. This arm I will thus present a backwardly and inwardly curved surface to the grain, whether the arm be acting as a reel or a rake, which will more securely divide and bring the cut grain upon the platform. All of the arms I will be thus constructed. It will also be seen, by reference to Fig. 8, that one of the arms I has short teeth 4 on the side directly opposite the longer raking-teeth. These short teeth 4 facilitate the work of reeling or gathering in the grain upon the platform when the arms are used as reels, and they are not in the way when the arms are used as rakes.

Having described my invention, what I claim as new, and desire to secure by Letters Patent, is—

1. The combination of endwise-movable pinion and shaft $b^3$ $b$ with the hollow axle B, hollow drive-wheel A, and frame $B^1$, substantially as described.

2. The shoe D adjustably connected by its front upturned end to the tongue C and connected by its rear end to the finger-bar F, in combination with the hinge $j$, which connects this shoe D to the arched extensions $B^3$ $B^3$ of the axle-frame $B^1$, substantially as described.

3. The arms I applied to short hinged shafts $s$, so as to rotate about their long axes, in combination with notched spur-wheels $h$ and spring-bolts $g^4$, and with a movable segment, $g^2$, and rail $g^3$, substantially as described.

4. The arms I rotating entirely around their own axis, in combination with the continuously-revolving combined rake and reel head, substantially as set forth.

5. The anti-friction wheel $t$, as a support for each arm I upon its cam-way E, in combination with the spur-wheel $h$ and a locking and unlocking device therefor, substantially as described.

6. The platform G hinged to the finger-bar at its inner and outer ends and having its downward movement limited by stop 3, substantially as described.

7. The rake and reel arm I, constructed with long raking-teeth on one side and shorter reeling-teeth on the opposite side, substantially as described.

8. The rake and reel arm forked at its outer end, substantially as and for the purpose described.

JOHN D. WILBER.

Witnesses:
   ISAAC W. WHITE,
   D. F. GARDNER.